Nov. 30, 1965  SHUKUO KINOSHITA ET AL  3,220,929
MICROBIOLOGICAL PRODUCTION OF AMINO ACID BY REDUCTIVE AMINATION
Filed Feb. 10, 1964
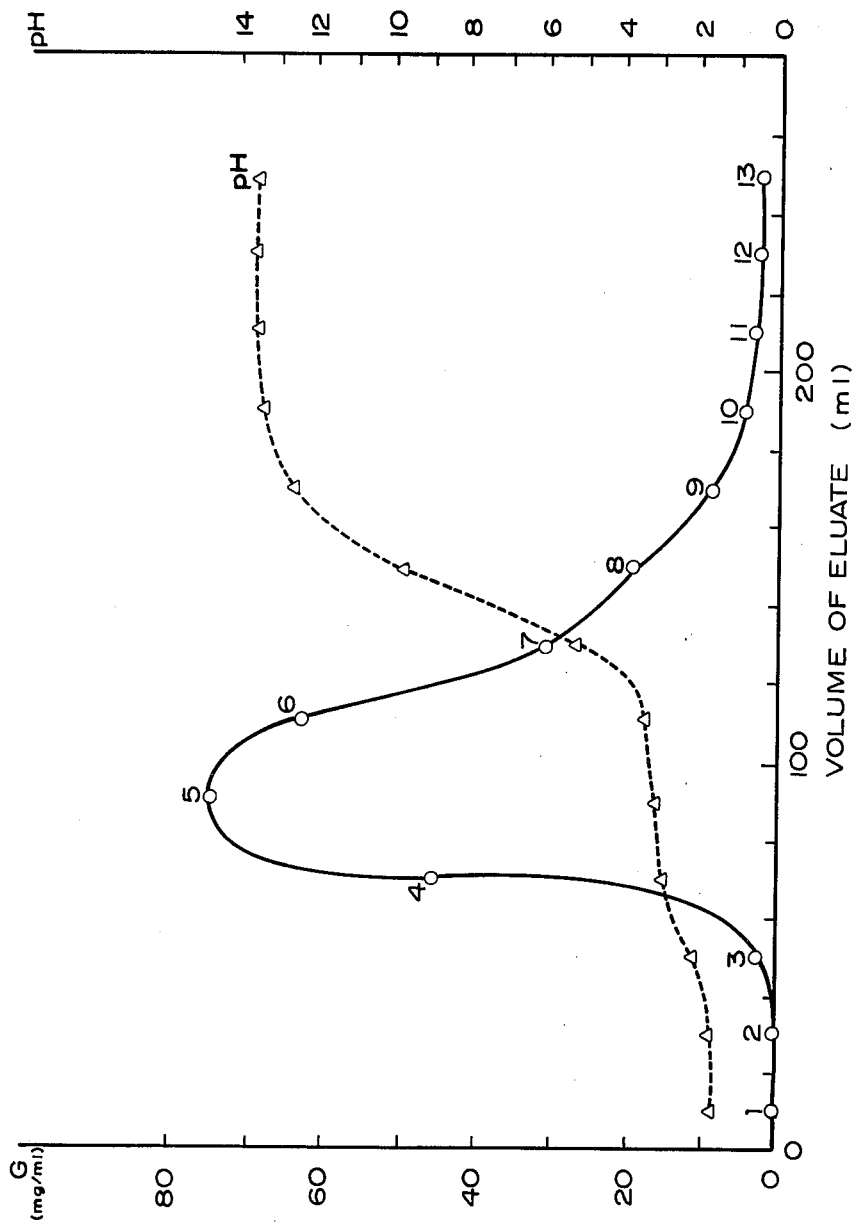
Shukuo Kinoshita,
Katsunobu Tanaka,
Shigezo Udaka and
Sadao Akita
INVENTORS
BY Wenderoth, Lind + Ponack,
ATTORNEYS

United States Patent Office 3,220,929
Patented Nov. 30, 1965

3,220,929
MICROBIOLOGICAL PRODUCTION OF AMINO
ACID BY REDUCTIVE AMINATION
Shukuo Kinoshita, Katsunobu Tanaka, Shigezo Udaka,
and Sadao Akita, all of Tokyo, Japan, assignors to Kyowa Hakko Kogyo Co., Ltd., Tokyo, Japan, a corporation of Japan
Filed Feb. 10, 1964, Ser. No. 343,892
7 Claims. (Cl. 195—29)

This application is a continuation-in-part of copending application Serial No. 714,069, filed on February 10, 1958, now abandoned which is a continuation-in-part of application Serial No. 615,745, filed on October 15, 1956 and also now abandoned.

This invention relates to an aerobic fermentation method of producing L-glutamic acid and its salts. The fermentation method of the instant invention involves a reductive amination which is brought about by culturing micro-organims (having special characteristics defined below) in a medium containing a saccharine material, i.e. a carbohydrate, nitrogenous and inorganic materials under conditions favorable for accumulating a large amount of L-glutamic acid therein, and recovering the same.

When microorganisms are cultured in suitable media, various kinds of amino acid may be produced. The amount produced, however, has been extremely small, and accumulation in a medium of a large amount of any particular kind of amino acid by a fermentation process has never been reported. The reason for extreme difficulty in accumulating a particular amino acid in a biological system is that amino acids are components of proteins, and any amino acid once produced in a medium may readily be resynthesized, e.g., to proteins or polypeptides, or may be converted or decomposed to other substances by various biochemical reactions. In other words, it is difficult to accumulate in a culturing medium an amino acid in the monomeric state. The word "monomeric state" is used in the present specification to mean monomolecular state whether it be a free acid or a salt.

This is the reason why a fermentation process, a direct use of biochemical activity of living cells of microorganism, has never been proposed heretofore for the biosynthesis and accumulation of L-glutamic acid. The known biosynthesis is effected in some enzymatic system, that is, a particular kind of enzyme is extracted from microorganisms, or from some animal or plant tissues, and the enzyme is reacted with suitable substrates, e.g. α-ketoglutaric acid and ammonium compounds under very limited reaction conditions.

An object of the present invention is to provide a method for producing directly a substantial amount of L-glutamic acid by culturing defined microorganisms in a liquid medium.

A further object of the present invention is to produce L-glutamic acid in industrially feasible quantities from saccharine materials by a direct reductive amination brought about by aerobic fermentation, utilizing living microorganisms.

A further object of the present invention is to establish the critical properties necessarily inherent in a microorganism which will convert saccharine materials directly to L-glutamic acid by reductive amination.

A further object of the present invention is to provide a method for accumulating in fermentation broth and free from mycelia a large amount of L-glutamic acid in the monomeric state, i.e. in readily recoverable form, by culturing a defined microorganism in a liquid medium.

A further object of the present invention is to provide a method for minimizing any side-reactions, such as polymerizing or decomposing L-glutamic acid, that might occur during the cultivation of the microorganism in a liquid medium.

According to the present invention, a strain of microorganism having certain particular biochemical characteristics is inoculated in a liquid medium, cultured in the medium, and a large amount of L-glutamic acid is produced in the medium by adjusting and maintaining the pH value of the medium in the range from 6 to 9 during the fermentation.

A microorganism suitable for use according to the present invention must satisfy two biochemically specific requirements:

(a) It must produce α-ketoglutaric acid from carbohydrate; and (b) It must have a strong activity of L-glutamic acid dehydrogenase, especially the strong activity for reductive amination of α-ketoglutaric acid.

For the production of L-glutamic acid according to this invention the microorganism must produce α-ketoglutaric acid from a carbohydrate source, e.g. a sugar, and must have a strong L-glutamic acid dehydrogenase activity; the microorganism should be particularly strongly active for the reverse reaction of the above reversible enzymatic reaction, that is the reductive amination of α-ketoglutaric acid.

Many different kinds of microorganisms, found in natural habitats, satisfy the defined biologically specific requirements. Said microorganisms are found widely in the various microbial fields, i.e. bacterial, yeasts and fungi, without restriction to any particular taxonomical group. Illustrative microorganisms are those exemplified in the following table:

Bacteria:
    Pseudomonadineae—
        Pseudomonas
            Pseudomonas aeruginosa
            Pseudomonas fluorescens
    Eubacteriales—
        Azotobacter
            Azotobacter agilis
        Rhizobium
            Rhizobium japonicum
        Escherichia
            Escherichia coli
        Aerobacter
            Aerobacter aerogenes
        Proteus
            Proteus vulgaris
        Micrococcus
            Micrococcus glutamicus
        Sarcina
            Sarcina lutea
        Bacillus
            Bacillus subtilis
            Bacillus megatherium
    Actinomycetales—
        Streptomyces
            Streptomyces tanashiensis
Molds:
    Phycomycetes—
        Mucor

*Mucor javanicus*
Rhizopus
  *Rhizopus nigricans*
Ascomycetes—
  Saccharomyces
    *Saccharomyces cerevisiae*
Fungi imperfecti—
  Torulopsis
    *Torulopsis utilis*
  Rhodotorula
    *Rhodotolura glutinis*
  Aspergillus
    *Aspergillus oryzae*
  Penicillium
    *Penicillium chrysogenum*

A further sub-division of certain yeast-like organisms on the basis of family is as follows:

Endomycetoideae—
  Schizosaccharomyces
    *Schizosaccharomyces pombe*
Saccharomycoideae—
  Zygosaccharomyces
    *Zygosaccharomyces major*
Saccharomyceteae—
  Willia
    *Willia anomala*
  Mycoderma
    *Mycoderma cerevisiae*

The Eubacteriales can be further subdivided. Examples of listed organisms within such a further sub-division are:

Gram-negative rods:
  Escherichia—
    *Escherichia coli*
Gram-positive spheres:
  Sarcina—
    *Sarcina lutea*
Gram-positive rods (contain endospores):
  Bacillus—
    *Bacillus megatherium*
Pleomorphic cells:
  *Micrococcus glutamicus*

The above-noted organism are exemplary of glutamic acid producers according to the mechanism required by the present invention. The listing is by no means exhaustive. Additional yeasts, for example, include *Pullularia pullulans* and *Sporobolomyces salmonicolor*. In addition those microorganisms of the genera of Corynebacterium, Microbacterium, Brevibacterium and Arthrobacter which have the dual biological properties, also accumulate glutamic acid in the media and are useful in the instant process. Bacteria, yeasts and fungi are amply exemplified; commercially practical organisms are also exemplified within each group. The yields of L-glutamic acid obtainable in a particular time and a particular medium from the use of each of the noted organisms may vary to a considerable extent.

What is of great import is the discovery that the properties involved in the instant invention do not fall within any genus, family, class, or other group according to accepted taxonomy. The classification of microorganisms in accord with this advance transcends established bounds. It is therefore impossible to specify microorganisms contemplated in terms of known genus and species designations. The only definitive distinction between microorganisms included and those excluded is encompassed in two specific properties:

(1) Ability of producing α-ketoglutaric acid from saccharine materials, i.e. carbohydrates; and (2) Strong activity of L-glutamic acid dehydrogenase, especially the strong activity for the reductive amination of α-ketoglutaric acid.

It is well known in the art how to test for the ability of a microorganism to produce α-ketoglutaric acid. A strain of any yeast, fungus, bacteria or streptomyces is, e.g., inoculated in each of the culture media A, B and C (all figures are in percent by weight of total unless otherwise specified):

|  | Medium A | Medium B | Medium C |
|---|---|---|---|
| Glucose | 10 | 10 | 10 |
| Peptone | 0.3 | 0.1 |  |
| $KH_2PO_4$ | 0.015 | 0.1 | 0.05 |
| $K_2HPO_4$ | 0.015 |  | 0.05 |
| $(NH_4)_2SO_4$ |  | 0.02 | 0.1 |
| $MgSO_4 \cdot 7H_2O$ | 0.01 | 0.04 | 0.05 |
| $MnSO_4 \cdot 4H_2O$ |  |  | 0.002 |
| Meat extract |  | 0.01 |  |
| Urea |  |  | 0.2 |
| Corn Steep liquor |  |  | 1.0 |
| $CaCl_2$ | 0.01 |  |  |
| NaCl | 0.001 | 0.3 |  |
| $FeCl_3$ | 0.001 |  |  |
| $CaCO_3$ | 5.0 | 4.0 | 3.0 |
| Fe |  | [1] 1 |  |
| n |  | [1] 1 |  |
| Potassium arsenite | [2] 0.01 |  |  |
| Water (distilled) | [3] | [3] | [3] |

[1] P.p.m.=Parts by weight per million parts by volume of total medium, the relationship between parts by weight and parts by volume being the same as that between grams and milliliters.
[2] Molar.
[3] Remainder.

The strain in each of said media is shaking-cultured for from three to four days at 28° C. in a large test tube (25 mm. x 190 mm.) containing about 10 milliliters (ml.) of medium. After completion of fermentation, α-ketoglutaric acid is analyzed by paper chromatography for keto acid (see, e.g., Smith, Ivor, "Chromatographic Techniques," page 178, William Heinemann Medical Books, Ltd., London, 1958).

For the purpose of this invention the ability to produce α-ketoglutaric acid is purely a qualitative requirement, and the quantity of α-ketoglutaric acid accumulated is not of the essence, as such. The microorganism must be one which has the ability to produce α-ketoglutaric acid as a product of its metabolism in an aerobic fermentation when cultured in a medium having saccharine material as a carbon source. α-Ketoglutaric acid is merely an intermediate product of said metabolism, and it is readily transformed to other intermediates or final products.

The ability to produce α-ketoglutaric acid is differentiated from the ability to accumulate said acid. Those microorganisms which finally accumulate α-ketoglutaric acid are "α-ketoglutaric acid-producing organisms," rather than "glutamic acid-producing organisms." It is thus clear that a minimal amount, if any, α-ketoglutaric acid may be accumulated. The amount is unimportant, what is important is that the microorganism possesses the ability to produce α-ketoglutaric acid when aerobically cultured in a medium containing saccharine material, e.g. carbohydrate, such as a sugar, i.e. glucose, fructose, maltose, etc., as a carbon source.

The nature of the present invention is further appreciated by an understanding of what is meant, e.g., by "strong activity of L-glutamic acid dehydrogenase." A comparison of L-glutamic dehydrogenase activity among various species is provided by Table I. A description of experimental methods follows:

(A) *Preparation of crude enzyme solution from type cultures of various microbes.*—One loopful of a strain to be tested is inoculated to 300 milliliters (ml.) of medium consisting of

| | Percent by weight |
|---|---|
| Glucase | 2 |
| Peptone | 1 |
| Meat extract | 0.5 |
| NaCl | 0.25 |
| $MgSO_4 \cdot 7H_2O$ | 0.025 |
| $K_2HPO_4$ | 0.1 |
| Yeast extract | 0.2 |
| Distilled water | Remainder |

The pH is adjusted to 7.0, and the strain is incubated for twenty-four hours at 28° C. in a rotary shaker [200 revolutions per minute (r.p.m.); radius 2.5 centimeters (cm.)].

After incubation, the fermented broth is centrifuged. Harvested cells are washed with ice cold biological saline water two or three times. The washed cells are homogenized, i.e. the cell walls are ruptured, by grinding with about twice their volume of fine quartz sand and extracted in M/15 phosphate buffer at a pH of 8.8.

The extract of the ruptured cells is centifuged for ten minutes at 10,000 r.p.m. (8000×g). The cell-free extract thus prepared is dialyzed for 20 hours at 0° C. in the same buffer (pH 8.8). The dialyzed cell-free extract is used as the crude enzyme solution for the determination of the activity of L-glutamic acid dehydrogenase.

(B) *Optical assay method for the determination of L-glutamic acid dehydrogenase activity.*—In accord with the method adopted by J. A. Olson and C. B. Anfinsen in J. Biol. Chem., 197, 67 (1952) the enzyme activity is assayed in the following reaction mixture:

| | | |
|---|---|---|
| Sodium glutamate | μM | 50 |
| TPN | μM | 1.0 |
| DPN | μM | 1.0 |
| Crude enzyme solution | ml | 1.0 |
| M/15 phosphate buffer (pH 8.8) | μM | 200 to 250 |
| Total volume | ml | 3.5 |

The substrate, pyridine nucleotide, enzyme and buffer are incubated at 30° C. in a total volume of 3.5 ml. Activity is measured by observing the change in absorption at 340 mμ in a Beckmann model Du spectrophotometer. Optical density readings are taken for six minutes at 1-minute intervals after admixture of the reaction mixture components.

After the crude enzyme solution is added in the reaction mixture (zero time), said reaction mixture is shaken as rapidly as possible. The increase in optical density (log 10:L) at 340 mμ between 1 and 6 minutes after zero time is assayed at 30° C. and is defined as ΔE.

The protein concentration is determined by a biuret method, and the specific activity of L-glutamic acid dehydrogenase is defined as ΔE per (gm.) of protein in the enzyme solution. ΔE is proportional to the concentration of the enzyme when ΔE is about 0.070. The activity of L-glutamic acid dehydrogenase is assayed in this range.

TABLE I

*Activity of L-glutamic acid dehydrogenase*

| Microorganism | Specific activity (ΔE/gm. protein) |
|---|---|
| Bacillus subtilis NRRL 558 | 2.7 |
| Bacillus natto | 1.4 |
| Bacillus cereus | 21.5 |
| Bacillus megatherium No. 3355 ATCC 15177 | 116.5 |
| Escherichia coli K-12 | 134.0 |
| Proteus vulgaris | 1020.0 |
| Serratia marcescens | 410.0 |
| Sarcina lutea No. 4121 ATCC 15176 | 80.0 |
| Pseudomonas fluorescens NRRL B-6 | 26.2 |
| Pseudomonas ovalis KY-3962 ATTC 15175 | 419.0 |
| Micrococcus epidermidis Hucker | 1.4 |
| Micrococcus sodonensis | trace |
| Micrococcus conglometratus | 28.0 |
| Micrococcus lysodeikticus Fleming 3333 | trace |
| Micrococcus varians ATCC 399 | 6.0 |
| Micrococcus citreus ATCC 4012 | 3.0 |
| Micrococcus flavus | 7.50 |
| Micrococcus pyogenes var. albus | trace |
| Micrococcus caseolyticus ATCC 8460 | trace |
| Micrococcus glutamicus No. 516 | 205.0 |
| Micrococcus glutamicus No. 534 ATCC 13032 | 560.0 |
| Micrococcus glutamicus No. 613 ATCC 13059 | 260.0 |
| Micrococcus glutamicus No. 614 ATCC 13060 | 350.5 |
| Micrococcus glutamicus No. 541 ATCC 13058 | 531.0 |
| Micrococcus glutamicus No. 560 ATCC 13761 | 434.0 |
| Micrococcus glutamicus No. 582 | 380.0 |
| Micrococcus glutamicus No. 588 | 570.0 |
| Saccharomyces cereviciae | 266.0 |
| Torulopsis utilis No. 812 ATCC 15239 | 660.0 |
| Rhodotolura glutinis No. 715 | 356.0 |
| Xanthomonas citri | trace |
| Aspergillus oryzae No. 3216 ATCC 15240 | 118.0 |
| Aspergillus niger | 132.0 |
| Aspergillus awamori | 170.0 |
| Penicillium chrysogenum No. 4235 | 630.0 |
| Penicillium spinulosum | 1650.0 |
| Rhizopus nigricans | 720.0 |
| Stroptomyces tanashiensis No. 1056 ATCC 15238 | 131.0 |

An alternative test for L-glutamic acid dehydrogenase activity is by way of ammonia absorption in a reaction mixture using the intact cell of mycellium. This method is further described later herein.

As seen from Table I, L-glutamic acid dehydrogenase activity is found extensively among bacteria, yeasts and fungi without respect to taxonomy. Specific activity of the L-glutamic acid dehydrogenase varies considerably between types of microbes and even among microbes of the same type.

Strong activity for reductive amination, according to the present invention, is strong L-glutamic acid dehydrogenase activity. For microbes which produce L-glutamic acid according to the mechanism herein involved, specific activity, as defined above, is directly correlated with dehydrogenase activity. An L-glutamic acid dehydrogenase activity for bacteria, e.g., is considered strong when the specific activity (ΔE/gm. protein) is at least 100.

The two biological requirements of the microorganisms previously mentioned may be correlated to determine an efficiency value for each microorganism. This efficiency is based on an interrelation of the biological requirements of the microorganism which have been previously mentioned. This efficiency may be determined by correlating the strength of L-glutamic acid dehydrogenase activity, especially the activity for reductive amination of α-ketoglutaric acid of a specific strain with its capacity for producing L-glutamic acid.

In the fermentative process of the instant invention a suitable balance of the terminal respiration system must exist to permit the essential coenzyme TPNH to exist in its reduced form rather than its oxidized form, TPN. In other words, the enzymatic reaction:

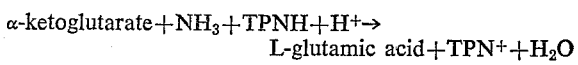

α-ketoglutarate+NH$_3$+TPNH+H$^+$→ L-glutamic acid+TPN$^+$+H$_2$O must be favored instead of the reverse reaction:

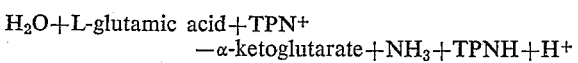

H$_2$O+L-glutamic acid+TPN$^+$ —α-ketoglutarate+NH$_3$+TPNH+H$^+$

An expression of this desired reaction direction may be formulated by calculating the efficiency of the cellular enzyme in bringing about the accumulation of L-glutamic acid. This calculation may be made by measuring the specific activity of the glutamic acid dehydrogenase of the microorganism under standard conditions and correlating this with the measurement of the capacity of the microorganism to produce glutamic acid under optimum conditions. The specific activity of L-glutamic acid dehydrogenase (ΔE/gm. protein determined by the Optical Assay method and listed in Table I above) is a measure of the amount of TPNH produced under conditions of optimum enzyme action. TPNH has a molar absorbing index of $6.2 \times 10^3$ at 340 millimicrons (m$\mu$). The capacity of the cellular enzyme to produce glutamic acid may then be calculated according to the following equation:

$$\frac{\Delta E/\text{gm. protein}}{6.2 \times 10^3} \times \text{Reaction volume} \times \frac{1 \text{ hour (hr.)}}{\text{Time of assay}}$$
$$= \text{mmols glutamic acid/gm. protein/hr.}$$

Referring to the Optical Assay method above it is found that the reaction volume is 3.5 ml. and the time of assay is 5 min. Taking then as an example *Micrococcus glutamicus* No. 534, the calculation is as follows:

$$\frac{560}{6.2 \times 10^3} \times 3.5 \text{ ml.} \times \frac{60 \text{ min.}}{5 \text{ min.}} = 3.8 \text{ mmols/gm. protein/hr.}$$

It is next necessary to calculate the capacity of the microorganism to produce L-glutamic acid under optimum conditions. In making this calculation reference must be made to the examples of Table VI which disclose the amounts of L-glutamic acid produced from various microorganisms under standard laboratory conditions with different media which favor the L-glutamic acid formation. It is to be noted that the microorganisms were cultured for a period of 72 hours in the medium in which the pH was in the range of 6.5 to 8.5. The amount of L-glutamic acid is given in grams per deciliter (gm./dl.). In order that the capacity of the microorganism to produce L-glutamic acid might be correlated to the capacity of the cellular enzyme to produce L-glutamic acid, it is necessary that the values calculated for each be defined in the same terms, i.e. in mmols/gm. protein/hr. It is thus necessary to convert the values given in the examples of Table VI from gm./dl. to mmols/gm. protein/hr. In making this conversion, it is necessary to know the time of fermentation in the examples, 72 hours, as well as the dry weight of the cells produced in the laboratory fermentations. The dry cell weight for the various microorganisms for which the enzyme efficiency has been calculated is given in Table II below. Returning to the calculation for *Micrococcus glutamicus* No. 534, it will be seen that the examples disclose that 3.2 gm./dl. were produced in 72 hours, or 32 gm./l./72 hr. From Table II it will be seen that the dry weight of the cells produced in the example with the organism was 8.1 gm./l. Thus the actual amount of glutamic acid produced was 0.44 gm./4.05 gm. cell protein/hr. This is equal to 0.75 mmols/gm. protein/hr. The calculated enzyme efficiency for *Micrococcus glutamicus* is then $$\frac{0.75}{3.8} \times 100 \text{ or } 19.6\%$$

In Table II there is presented a list of the enzyme efficiency for various microorganisms of the instant invention.

In the process of the instant invention the most desirable results are achieved with those microorganisms in which the calculated enzyme efficiency is greater than about 10%. Through the use of these microorganisms in which the enzyme efficiency exceeds this value the most desirable industrial operations are achieved.

TABLE II

| Microorganism | L-glutamic acid dehydrogenase, E/g. protein/ 5 min. | L-glutamic acid accumulated, g./liter | Dry cell weight, g./liter | Enzyme efficiency, percent |
| --- | --- | --- | --- | --- |
| *Bacillus megatherium* No. 3355 ATCC 15177 | 116.5 | 9.0 | 10.0 | 22 |
| *Bacillus lentus* CN 2750 | 189.1 | 12.0 | 6.9 | 29 |
| *Bacillus circulans* CN 2925 | 142.0 | 10.0 | 7.15 | 28 |
| *Escherichia coli* K-12 | 134.0 | 5.0 | 13.34 | 7.5 |
| *Sarcina lutea* No. 4121 ATCC 15176 | 80.0 | 2.0 | 10.78 | 6.5 |
| *Micrococcus glutamicus* 534 ATCC 13032 | 560.0 | 32.0 | 8.10 | 19.6 |
| *Micrococcus glutamicus* 560 ATCC 13761 | 434.0 | 35.0 | 8.70 | 27.5 |
| *Micrococcus glutamicus* 516 | 205.0 | 28.0 | 12.28 | 31 |
| *Micrococcus glutamicus* 582 | 380.0 | 30.0 | 10.00 | 22.1 |
| *Micrococcus glutamicus* 588 | 570.0 | 34.0 | 7.10 | 22.5 |
| *Streptomyces tanashiensis* No. 1056 ATCC 15238 | 131.0 | 8.0 | 10.0 | 17 |
| *Torulopsis utilis* No. 812 ATCC 15239 | 660.0 | 6.0 | 20.0 | 1.2 |
| *Rhodotorula glutinis* No. 715 | 356.0 | 8.0 | 15 | 4.2 |
| *Aspergillus oryzae* No. 3216 ATCC 15240 | 118.0 | 5.0 | 25 | 4.8 |
| *Penicillium chrysogenum* No. 4235 | 630.0 | 8.0 | 18 | 1.9 |

Screening tests covering various genera of microorganisms from miscellaneous origins are carried out. The composition of media useful for the screening are shown in Table III. Fermentation tests are done with either shaking or stationary cultures. Small portions of samples are removed from the flasks at intervals and amino acids are checked by paper chromatography. For the quantitative analysis of L-glutamic acid, the bioassay using *Leuconostoc mesenteroides* P-60 (ATCC No. 8042) or the manometric method using glutamic decarboxylase preparation obtained from *E. coli* C-6 (obtained from University of Osaka, Osaka, Japan) was adopted.

TABLE III

*Compositions of media used for the screening tests*

| Materials | A | B | C | D | E | F |
| --- | --- | --- | --- | --- | --- | --- |
| Glucose, percent | 5.0 | 5.0 | 5.0 | 5.0 | 2.0 | 5.0 |
| Ammonium sulfate, percent | | 2.0 | | | | |
| Ammonium phosphate, percent | | | | 0.3 | | |
| Urea, percent | 0.8 | | 0.8 | 0.5 | | 0.5 |
| Meat extract, percent | 0.2 | 0.2 | 0.2 | | | |
| Peptone, percent | 0.2 | 0.2 | | | | |
| Yeast extract, percent | | | | 0.5 | | |
| Corn steep liquor, percent | | | | | 0.5 | 0.5 |
| Salts [1] | + | + | + | + | + | + |
| Calcium carbonate, percent | | 0.3 | | | | |
| pH | 7.2 | 7.2 | 7.2 | 6.0 | 6.0 | 6.0 |

[1] Salts: ($K_2HPO_4$, 0.1–0.05%; $MgSO_4 \cdot 7H_2O$, 0.02–0.05%).

TABLE IV

*Distribution of L-glutamic acid producing strains among various groups of microorganisms*

| | Number of strains tested | Medium | Approximate percent of glutamate producers | Example |
|---|---|---|---|---|
| Bacteria | 650 | A and B | 20 | E. coli. B. megatherium. Sarcina lutea. M. glutanicus. |
| Streptomycetes | 372 | A and B | 30 | St. tanashiensis. St. cinnamonensis. |
| Yeasts | 468 | D and E | 30 | Rhodotorula glutinis. Pullularia pullulans. Sporobolomyces salmonicolor. Torulopsis utilis. |
| Fungi | 475 | C and F | 10 | Pen. chrysogenum. Asp. oryzae. |

A brief idea of the distribution of glutamic acid producing strains in the microbial field is given in Table IV.

Glutamic acid producing strains are widely distributed among various genera. However, strains which have the ability to accumulate large amounts of glutamate, i.e. glutamic acid or a salt (ordinarily an alkali metal salt, such as sodium or potassium glutamate; an alkaline earth metal salt, such as calcium glutamate; or ammonium glutamate, depending upon the pH of the medium and the ions available therein) thereof, are rather rare; the amounts produced additionally vary according to fermentation conditions.

This leads to another feature of the present invention—control of the conditions of fermentation. The culture medium composition may be any one suitable for the growth of the particular microorganism. To accomplish vigorous carbohydrate metabolism by said microorganism, nitrogenous materials, e.g. peptone, ammonium sulfate, ammonia, corn steep liquor and urea; inorganic materials, e.g. $K_2HPO_4$ and $MgSO_4 \cdot 7H_2O$; and other materials required by the organism, e.g. biotin; are incorporated in the culture medium. The medium must contain a carbohydrate source, e.g. glucose.

Organic acids tend to accumulate from carbohydrate metabolism of a microorganism, rendering the medium acidic. The fermentative production of L-glutamic acid is substantially affected by the pH of the medium during the course of fermentation. Control of the pH between 6.0 and 9.0, e.g. by the intermittent addition thereto of ammonia or sodium hydroxide, favors the production and accumulation of L-glutamic acid; the optimum pH value appears to be from about 7.0 to about 8.5. According to the present invention, the pH of the culture medium is preferably adjusted and maintained in the range from 6.5 to 8.5 by the addition thereto of a compound containing a basic nitrogenous radical, e.g. ammonium hydroxide, urea and ammonium carbonate. Thus, α-ketoglutaric acid produced is combined with ammonium ions by the action of strong reductive amination of L-glutamic acid dehydrogenase contained in the microorganism; this results in the formation of L-glutamic acid. Strong reductive amination activity of L-glutamic acid dehydrogenase of the microorganisms and maintenance of the pH within the optimum range minimize various unfavorable side reactions. In this way the reaction toward L-glutamic acid formation predominates over side reactions, and a large amount of L-glutamic acid is accumulated in the medium.

Various processes may be utilized for neutralizing the culture medium. In any case, a requisite amount of ammonium ions should be supplied to the medium. Combined use of ammonium salts and alkalis is also within the scope of the present invention.

As has been previously pointed out, the instant invention provides a method for accumulating in the fermentation broth and free from the mycelia a large amount of L-glutamic acid in the monomeric form. Thus the L-glutamic acid formed is easily recoverable from the culture medium without difficult hydrolysis methods being necessary. The L-glutamic acid or its salt accumulated in the medium may be recovered by a known suitable process, such as by the use of ion exchange resin. The method of recovery of the L-glutamic acid from the medium will be illustrated in the examples below.

EXAMPLES

For a clearer understanding of the present invention, examples are given below in connection with production of L-glutamic acid. These examples are not to be construed as exhaustive but are merely illustrative of the invention. Percent (%) figures indicate percent by weight unless otherwise indicated. The amount of L-glutamic acid accumulated is given in grams per deciliter (g./dl.).

Various microorganisms are tested for the required specific biochemical capacities above mentioned, and suitable organisms are selected. The method of testing the ability to produce α-ketoglutaric acid from saccharine materials is well known to those skilled in the art as set forth previously. A strain is cultured (by shaking culture) in a liquid medium containing saccharine i.e. carbohydrates, material and other nutrients. A test for α-ketoglutaric acid is made by paper-chromatography; when necessary Friedemann-Haugen's colorimetric quantitative analysis is also used.

The L-glutamic acid dehydrogenase activity, especially the strength of the ability for reductive amination of α-ketoglutaric acid, according to the optical assay method described supra, is tested. An alternative test is by way of ammonia absorption in a reaction mixture using the intact cell or mycellium. The quantitative test of ammonia absorption is performed according to the method described in "Microdifussion Analysis and Volumetric Error" (E. J. Conway, London, Lockwood and Son Ltd. 1950).

A culture of the microorganism to be tested is subjected to shaking in the medium, e.g. glucose bouillon, Koji extract, or Czapek solution; after cultivation for 20 to 40 hours the cell or mycellium in the medium is centrifuged out and washed with water. The cell or mycellium is then suspended in a phosphate buffer solution of pH 8. The reaction mixture employed for testing the said enzyme activity is given below.

TABLE V

*Composition of reaction mixture*

|  | Concentration | Amount used, ml. |
|---|---|---|
| Glucose solution | 100 mM | 1 |
| α-Ketoglutaric acid solution | 200 mM | 1 |
| Diammonium phosphate solution | 100 mM | 1 |
| Cell (or mycellium) suspension (wet cell or mycellium). | 30 to 50 mg./ml. | 1 |
| Phosphate buffer solution (pH 8) | 1/15M | 5 |
|  |  | 9 |

The reaction mixture is filled up to 10 ml. with water.

The control experiments are carried out at the same time, one with solution without glucose and the other with solution without either glucose or α-ketoglutaric acid from the above reaction mixture. The latter control solution gives the basic amount of ammonia absorption in this reaction. The reaction is allowed to stand for one hour at 37° C. The amount of ammonia consumed is measured to determine the activities of said enzymes.

The results shown in Table I indicate that the strength of the reductive amination of α-ketoglutaric acid is widely variable by each strain, and they indicate that taxonomical position has nothing to do with the strength of the enzyme action. The strength of enzyme action is a specific characteristic of an individual microorganism independent taxonomy.

In Table VI there are presented the results of tests in which various microorganisms are cultured, in a 250 ml. Erlenmeyer's flash containing 20 ml. of the medium, at 30° C. for 72 hours by rotary shaking (220 r.p.m.). The pH value of each broth is controlled with ammonia water or ammonium carbonate solution between the range of 6.5 to 8.5. L-glutamic acid produced in the medium is determined intervally (24 hours). The amount of glutamic acid accumulated shown in the table is the maximum value obtained in the fermentation. The + sign in the column headed α-ketoglutaric acid producing ability indicates that the microorganism possesses this ability.

TABLE VI

| Example No. | Microorganism | Composition of Medium | α-Ketoglutaric acid producing ability | Specific activity of L-glutamic acid dehydrogenase | L-glutamic acid accumulated g./dl. |
|---|---|---|---|---|---|
| 1 | *Bacillus megatherium*, No. 3355 ATCC 15177. | Glucose 5.0%, $(NH_4)_2SO_4$ 1.0%, $KH_2PO_4$ 0.05%, $K_2HPO_4$ 0.05%, $MgSO_4 \cdot 7H_2O$ 0.05%, $MnSO_4 \cdot 4H_2O$ 0.002%, peptone 0.1%, yeast extract 0.1%, $CaCO_3$ 2.0%. | + | 116.5 | 0.9 |
| 2 | *Bacillus lentus*, CN 2750 | Glucose 5.0%, $K_2HPO_4$ 0.1%, $MgSO_4 \cdot 7H_2O$ 0.05%, $MnSO_4 \cdot 4H_2O$ 0.002%, $FeSO_4 \cdot 7H_2O$ 0.002%, NZ amine 0.2%, urea 0.3%, C.S.L. 0.1%. | + | 189.1 | 1.2 |
| 3 | *Bacillus circulans*, CN 2925 | do | + | 142.0 | 1.0 |
| 4 | *Escherichia coli*, K-12 | Glucose 5.0%, $K_2HPO_4$ 0.1%, $MgSO_4 \cdot 7H_2O$ 0.05%, $MnSO_4 \cdot 4H_2O$ 0.002%, $(NH_4)_2SO_4$ 2.0%, urea 0.8%, meat ext. 0.1%, peptone 0.1%, $CaCO_3$ 3.0%. | + | 134.0 | 0.5 |
| 5 | *Sarcina lutea*, No. 4121 ATCC 15176. | do | + | 80.0 | 0.2 |
| 6 | *Micrococcus glutamicus*, No. 534 ATCC 13032. | Glucose 10.0%, $K_2HPO_4$ 0.1%, $MgSO_4 \cdot 7H_2O$ 0.05%, $MnSO_4 \cdot 4H_2O$ 0.002%, $FeSO_4 \cdot 7H_2O$ 0.002%, urea 0.5%, C.S.L. 0.25%, NZ-amine 0.25%, $(NH_4)_2SO_4$ 0.2%. | + | 560.0 | 3.2 |
| 7 | *Micrococcus glutamicus*, No. 560 ATCC 13761. | do | + | 434.0 | 3.5 |
| 8 | *Micrococcus glutamicus*, No. 516 | do | + | 205.0 | 2.8 |
| 9 | *Micrococcus glutamicus* No. 582 | Glucose 10.0%, $K_2HPO_4$ 0.05%, $KH_2PO_4$ 0.05%, $MgSO_4 \cdot 7H_2O$ 0.05%, $MnSO_4 \cdot 4H_2O$ 0.002%, $FeSO_4 \cdot 7H_2O$ 0.002%, biotin 2.5 γ/l., thiamine 10 γ/dl., peptone 0.1%, urea 0.5%. | + | 380.0 | 3.0 |
| 10 | *Micrococcus glutamicus*, No. 588 | do | + | 570.0 | 3.4 |
| 11 | *Micrococcus glutamicus*, No. 541 ATCC 13058. | Glucose 10.0%, $K_2HPO_4$ 0.1%, $MgSO_4 \cdot 7H_2O$ 0.05%, $MnSO_4 \cdot 4H_2O$ 0.002%, $FeSO_4 \cdot 7H_2O$ 0.002%, urea 0.5%, C.S.L. 0.25%, NZ-amine 0.25%, $(NH_4)_2SO_4$ 0.2%. | + | 531.0 | 2.8 |
| 12 | *Micrococcus glutamicus*, No. 613 ATCC 13059. | Glucose 10.0%, $K_2HPO_4$ 0.05%, $KH_2PO_4$ 0.05%, $MgSO_4 \cdot 7H_2O$ 0.05%, $MnSO_4 \cdot 4H_2O$ 0.002%, $FeSO_7H \cdot 2O$ 0.002%, biotin 2.5 γ/l., thiamine 10 γ/dl., peptone 0.1%, urea 0.5%. | + | 260.0 | 3.0 |
| 13 | *Micrococcus glutamicus*, No. 614 ATCC 13060. | do | + | 350.5 | 3.2 |
| 14 | *Streptomyces tanashiensis*, No. 1056 ATCC 15238. | Glucose 5.0%, $KH_2PO_4$ 0.1%, $MgSO_4 \cdot 7H_2O$ 0.05%, $MnSO_4 \cdot 4H_2O$ 0.002%, $FeSO_4 \cdot 7H_2O$ 0.005%, $(NH_4)_2SO_4$ 2.0%, C.S.L. 0.5%, $CaCO_3$ 2.0%. | + | 131.0 | 0.8 |
| 15 | *Pseudomonas fluorescens*, NRRL-B-6. | Glucose 8.0%, $KH_2PO_4$ 0.05%, $K_2HPO_4$ 0.05%, $MgSO_4 \cdot 7H_2O$ 0.05%, $MnSO_4 \cdot 4H_2O$ 0.002%, $FeSO_4 \cdot 7H_2O$ 0.002%, $(NH_4)_2SO_4$ 1.0%, meat ext. 0.5%, peptone 0.2%, $CaCO_3$ 3.0%. | + | 26.2 | 0.2 |
| 16 | *Pseudomonas ovalis*, KY 3962 ATCC 15175. | do | + | 419 | 0.8 |
| 17 | *Aerobacter aerogenes*, ATCC 8308 | Glucose 5.0%, $K_2HPO_4$ 0.1%, $MgSO_4 \cdot 7H_2O$ 0.05%, $MnSO_4 \cdot 4H_2O$ 0.002%, $(NH_4)_2SO_4$ 2.0%, urea 0.8%, meat ext. 0.1%, peptone 0.1%, $CaCO_3$ 3.0%. | + | 30.0 | 0.3 |
| 18 | *Torulopsis utilis*, No. 812 ATCC 15239. | Glucose 10.0%, $KH_2PO_4$ 0.1%, $MgSO_4 \cdot 7H_2O$ 0.05%, urea 0.5%, $(NH_4)_2SO_4$ 2.0%, yeast ext. 0.5%, $CaCO_3$ 3.0%. | + | 660.0 | 0.6 |
| 19 | *Rhodotorula glutinis*, No. 715 | Glucose 10.0%, $KH_2PO_4$ 0.1%, $MgSO_4 \cdot 7H_2O$ 0.05%, urea 0.5%, $(NH_4)_2SO_4$ 1.5%, $NH_4H_2PO_2$ 0.5%, $CaCO_3$ 2.0%. | + | 356.0 | 0.8 |
| 20 | *Aspergillus oryzae*, No. 3126 ATCC 15240. | Glucose 10.0%, $KH_2PO_4$ 0.1%, $MgSO_4 \cdot 7H_2O$ 0.05%, $FeSO_4 \cdot 7H_2O$ 0.002%, $MnSO_4 \cdot 4H_2O$ 0.002%, urea 0.5%, $(NH_4)_2SO_4$ 2.0%, $CaCO_3$ 1.0%, yeast ext. 0.2%. | + | 118.0 | 0.5 |
| 21 | *Penicillium chrysogenum*, No. 4235. | Glucose 10.0%, $K_2HPO_4$ 0.1% $MgSO_4 \cdot 7H_2O$ 0.05%, $FeSO_4 \cdot 7H_2O$ 0.002%, $MnSO_4 \cdot 4H_2O$ 0.002%, $(NH_4)_2SO_4$ 2.0%, C.S.L. 0.25%, $CaCO_3$ 3.0%. | + | 630.0 | 0.8 |

From the data in Table VI it is evident that the two specific biochemical activities of a microorganism have a direct correlation with the production and accumulation of L-glutamic acid.

Ammonia water or ammonium carbonate is added to the medium to maintain its pH within a range from 6.5 to 8.5. In lieu of these substance, e.g. $NH_4OH$, $(NH_2)_2CO$, $(NH_4)_2CO_3$, etc., which (a) contains basic nitrogen, (b) provides ammonium ions and (c) makes the pH alkaline can be used. The above-mentioned pH controlling compounds serve a dual function of supplying to the medium the required amount of NH₄ ion for the reductive amination and of simultaneously favoring the enzymatic reaction to accumulate L-glutamate by a proper pH control. Alternatively, various ammonium salts, such as $$(NH_4)_2SO_4, NH_4Cl \text{ and } NH_4NO_3$$

may be used together with caustic alkalis, such as NaOH, to provide the same two functions accomplished by the aforementioned single compounds. In the latter case the sole function of the caustic alkali is pH control.

The results given in Table VII show the effect of control of the pH upon the amount of glutamic acid produced in the medium.

TABLE VII

| Organism (Medium) | No pH control | pH controlled 6.5–8.5 | | |
|---|---|---|---|---|
| | Amounts of L-glutamic acid (mg./100 ml.) | Amounts of L-glutamic acid (mg./100 ml.) | Consumed glucose (g./100 ml.) | Yields (percent) based on consumed glucose |
| Bacillus subtilis No. 3369 ATCC 15244 (A) | | 22 | 420 | 2.4 | 17.5 |
| Micrococcus glutamicus No. 534 ATCC 13032 (A) | | 240 | 980 | 3.2 | 30.6 |
| Torulopsis utilis No. 812 ATCC 15239 (A) | | 23 | 670 | 3.0 | 22.3 |
| Aspergillus oryzae No. 3216 ATCC 15240 (B) | | 8 | 520 | 3.4 | 15.3 |
| Mucor javanicus No. 3423 ATCC 15242 (B) | | 3 | 340 | 3.2 | 10.6 |

The media employed were as follows:
Medium A contains 50 g. of glucose, 5 g. of peotone, 5 g. of urea, 1.0 g. of K₂HPO₄, 0.1 g. of MgSO₄·7H₂O and is filled up to 1 l. with water.
Medium B contains 50 g. of glucose, 10 g. of corn steep liquor, 15 g. of ammonium sulfate, 1.0 g. of K₂HPO₄, 0.1 g. of MgSO₄·7H₂O and is filled up to 1 l. with water.

Table VII shows that fermentation under proper pH control is essential for a substantial accumulation of L-glutamic acid in the culture medium; while in the absence of pH control, even the organism which should accumulate the said acid fails to accumulate it.

As has been previously pointed out, the recovery of the L-glutamic acid produced in the medium by the process of the instant invention may be achieved by various methods. The recovery by means of ion exchange process is illustrated below:

Recovery of glutamic acid from *Streptomyces tanashiensis* by ion exchange method.

*(1) Culture*

Composition of medium: Percent
- glucose _____ 10
- KH₂PO₄ _____ 0.1
- MgCO₄·7H₂O _____ 0.05
- Urea _____ 0.5
- Corn Steep Liquor _____ 0.5
- pH 6.5.

300 ml. of the above medium is placed in a 2 liter (l.) flask with baffle. *Streptomyces tanashiensis* No. 1056 ATCC 15238 is inoculated in the medium and incubated for 72 hours at 28° C. (five flasks are used).

Following incubation, the broth of the five flasks are brought together and the pH of the broth is adjusted to 2.0 by 6 N H₂SO₄, and in addition 30 grams (gm.) of Celite is mixed with the broth. The broth is then filtered by aspiration.

Filtrate, 1.38 l.:
- Glutamic acid _____ 4.20 milligrams per milliliter (mg./ml).
- Total glutamic acid _____ 5.796 gm.
- NH₃ _____ 1.01 mg./ml.

*(2) Resin column*

100 ml. of Diaion SK# 1A (H⁺) (trade name of product by Mitsubishi Chemical Industries Ltd., Japan), sulfonated copolymer of styrene and divinyl benzene, is packed in a glass column 2 cm. in diameter.

*(3) Ion exchange process*

1.2 l. of the filtrate (pH 2.0, L-glutamic acid 4.20 mg./ml. total L-glutamic acid 5.04 gm.) is passed through the resin column at the rate of S.V.≐1 (down flow process).

$$S.V. = \text{Space velocity} = \frac{\text{Volume of charged liquid/hour}}{\text{Volume of resin}}$$

After the charging is complete, 300 ml. of dionized water is passed through by the same process.

The total volume of spent broth and wash water is 1.46 l. (trace L-glutamic acid is detected). Adsorption efficiency is about 100%. Adsorbed L-glutamic acid is eluted with 1 N NaOH by the down flow process at the rate of S.V.≐1. The eluate is cut in 20 ml. portions and each cut is assayed.

The elution curve is shown in the accompanying drawing.

Cuts numbers 4 to 8 are taken out as L-glutamic acid rich cuts.

The mean L-glutamic acid concentration is 45.6 mg./ml., total L-glutamic acid is 4.56 gm., and the pH is 6.2. The resin process yield is 90.47%.

*(4) Recovery of crystalline L-glutamic acid*

90 ml. of the rich cut (L-glutamic acid—45.6 mg./ml. total L-glutamic acid 4.104 gm.) is concentrated at about 40° C. under reduced pressure to about 30 ml., and the concentrate is transferred to a 100 ml. beaker.

The evaporating flask is washed 3 times with 5 cubic centimeter (cc.) portions of water, and the wash added to the concentrate. The pH of the concentrate is adjusted to 3.2 by adding 6 N HCl accompanied with slow agitation with a magnetic stirrer. The L-glutamic acid is then crystallized rapidly.

The slurry is allowed to stand overnight at 5° C. The crystalline L-glutamic acid is filtered, washed with a small amount of deionized water and dried. 3.61 gm. of L-glutamic acid is obtained. The purity is 97.7%. The yield of crystallization process is 86.0%. The total yield is 67.8%.

What is claimed is:

1. A fermentative method of producing L-glutamic acid by reductive amination which comprises the steps of
   (1) culturing a microorganism in a liquid medium containing as essential constituents a saccharine material and a nitrogen source, which microorganism possesses;
      (a) the ability to produce α-ketoglutaric acid from sacccharine material, and
      (b) strong L-glutamic acid dehydrogenase activity, and in which microorganism the enzyme efficiency value is at least 10%, this value being obtained by correlating the capacity of the dehydrogenase enzyme to produce glutamic acid in the reversible enzymatic reaction with the capacity of the microorganism to produce glutamic acid by fermentation from saccharine material in the presence of a nitrogen source;
   (2) maintaining the pH of the culturing medium within the range of from 6 to 9 by addition of neutralizing agent until a substantial amount of a product selected from the group consisting of L-glutamic acid and a salt thereof is accumulated in the medium; and
   (3) recovering the thus formed product from said medium.

2. A process as claimed in claim 1 wherein the medium contains glucose, urea and ammonium sulfate and the pH is maintained between 6.5 and 8.5 by the addition of ammonium carbonate solution.

3. A process as claimed in claim 1 wherein the culturing is carried out for about 72 hours.

4. A process as claimed in claim 1 wherein the recovery of the L-glutamic acid is effected by means of an ion exchange resin process.

5. A fermentative method for producing L-glutamic acid by reductive amination which comprises the steps of
   (1) culturing a microorganism in a liquid medium containing as essential constituents a saccharine material and at least one compound selected from the group consisting of urea, ammonium carbonate, ammonium chloride and ammonium sulfate, which microorganism possesses:
      (a) the ability to produce α-ketoglutaric acid from saccharine material, and
      (b) strong L-glutamic acid dehydrogenase activity and in which microorganism the enzyme efficiency value is at least 10%, this value being obtained by correlating the capacity of the dehydrogenase enzyme to produce glutamic acid in the reversible enzymatic reaction with the capacity of the microorganism to produce glutamic acid by fermentation from saccharine material in the presence of a nitrogen source;
   (2) maintaining the pH of the culturing medium within the range of from 6 to 9 by addition of neutralizing agent until a substantial amount of a product selected from the group consisting of L-glutamic acid and a salt thereof is accumulated in the medium; and
   (3) recovering the thus formed product from said medium.

6. A fermentative method for producing L-glutamic acid by reductive amination which comprises the steps of
   (1) culturing a microorganism selected from the genus Bacillus in a liquid medium containing as essential constituents a saccharine material and a nitrogen source, which microorganism possesses:
      (a) the ability to produce α-ketoglutaric acid from saccharine material, and
      (b) strong L-glutamic acid dehydrogenase activity, and in which microorganism the enzyme efficiency value is at least 10%, this value being obtained by correlating the capacity of the dehydrogenase enzyme to produce glutamic acid in the reversible enzymatic reaction with the capacity of the microorganism to produce glutamic acid by fermentation from saccharine material in the presence of a nitrogen source;
   (2) maintaining the pH of the culturing medium within the range of from 6 to 9 by addition of neutralizing agent until a substantial amount of a product selected from the group consisting of L-glutamic acid and a salt thereof is accumulated in the medium; and
   (3) recovering the thus formed product from said medium.

7. A fermentative method for producing L-glutamic acid by reductive amination which comprises the steps of
   (1) culturing a microorganism selected from the genus Streptomyces in a liquid medium containing as essential constituents a saccharine material and a nitrogen source, which microorganism possesses:
      (a) the ability to produce α-ketoglutaric acid from saccharine material, and
      (b) strong L-glutamic acid dehydrogenase activity, and in which microorganism the enzyme efficiency value is at least 10%, this value being obtained by correlating the capacity of the dehydrogenase enzyme to produce glutamic acid in the reversible enzymatic reaction with the capacity of the microorganism to produce glutamic acid by fermentation from saccharine material in the presence of a nitrogen source;
   (2) maintaining the pH of the culturing medium within the range of from 6 to 9 by addition of neutralizing agent until a substantial amount of a product selected from the group consisting of L-glutamic acid and a salt thereof is accumulated in the medium; and
   (3) recovering the thus formed product from said medium.

References Cited by the Examiner
UNITED STATES PATENTS

| | | | |
|---|---|---|---|
| 2,749,279 | 6/1956 | Smythe et al. | 195—30 |
| 2,789,939 | 4/1957 | Kita | 195—36 |
| 2,921,002 | 1/1960 | Kita | 195—35 |
| 3,003,925 | 10/1961 | Kinoshita et al. | 195—47 |

A. LOUIS MONACELL, *Primary Examiner.*

NORMAN G. TORCHIN, *Examiner.*

L. M. SHAPIRO, *Assistant Examiner.*

UNITED STATES PATENT OFFICE
CERTIFICATE OF CORRECTION

Patent No. 3,220,929                                          November 30, 1965

Skukuo Kinoshita et al.

It is hereby certified that error appears in the above numbered patent requiring correction and that the said Letters Patent should read as corrected below.

Column 3, line 45, for "organism" read -- organisms --; column 4, in the first table, first column, line 16 thereof, for "n" read -- Mn --; same column, in the second table, left-hand column, line 1 thereof, for "Glucase" read -- Glucose --; column 5, line 31, for "Dµ" read -- DU --; line 42, after "per" insert -- gram --; line 68, for "7.50" read -- 75.0 --; column 9, TABLE IV, fifth column, line 4 thereof, for "M. glutanicus", in italics, read -- M. glutamicus --, in italics; column 9, line 30, for "amount sof" read -- amounts of --; columns 11 and 12, TABLE VI, third column, line 19 thereof, for "2.5 α/1." read -- 2.5 γ/1. --; same TABLE VI, third column, lines 26 and 27 thereof, for "FeSO7H$_4$.$_2$0 0.002%, biotin 2.5α/1." read -- FeS0$_4$.7H$_2$0 0.002%, biotin 2.5 γ/1. --; same TABLE VI, second column, fourth line from the bottom, for "No. 3126" read -- No. 3216 --; column 12, line 71, after "these" insert -- any --; column 13, line 57, for "MgCO$_4$.7H$_2$O" read -- MgSO$_4$.7H$_2$O --; column 14, line 15, for "dionized" read -- deionized --; line 49, for "of" read -- for --.

Signed and sealed this 12th day of April 1966.

(SEAL)
Attest:

ERNEST W. SWIDER                                      EDWARD J. BRENNER
Attesting Officer                                      Commissioner of Patent